United States Patent [19]

Nakanishi et al.

[11] Patent Number: 5,300,610
[45] Date of Patent: Apr. 5, 1994

[54] MANUFACTURED METHOD OF ALKOXY RADICAL-CONTAINING SILICONE RESIN

[75] Inventors: Junji Nakanishi; Toshio Saruyama, both of Chiba, Japan

[73] Assignee: Dow Corning Toray Silicone Co., Ltd, Tokyo, Japan

[21] Appl. No.: 13,901

[22] Filed: Feb. 5, 1993

[30] Foreign Application Priority Data

Feb. 25, 1992 [JP] Japan .................. 4-073537

[51] Int. Cl.$^5$ .............................................. C08G 77/06
[52] U.S. Cl. ........................................ 528/14; 528/34; 525/477
[58] Field of Search ................ 528/14, 34; 525/477

[56] References Cited

U.S. PATENT DOCUMENTS

| | | | |
|---|---|---|---|
| 3,234,179 | 2/1966 | Katchman et al. | 260/46.5 |
| 3,389,114 | 6/1968 | Burzynski et al. | 260/32 S |
| 3,846,358 | 11/1974 | Roedel | 260/18 S |
| 4,387,196 | 6/1983 | Bonnet et al. | 528/14 |
| 4,387,196 | 6/1983 | Bonnet et al. | 525/477 |
| 4,388,449 | 6/1983 | Bonnet et al. | 528/14 |
| 4,413,104 | 11/1983 | Deubzer et al. | 528/14 |

FOREIGN PATENT DOCUMENTS 50-77500  6/1975  Japan .
792470  12/1954  United Kingdom .

*Primary Examiner*—Melvyn I. Marquis
*Attorney, Agent, or Firm*—Sharon K. Severance

[57] ABSTRACT

The invention provides a method for manufacturing an alkoxy radical-containing silicone resin wherein the molecular weight, viscosity, thermal transition point, and alkoxy radical content can be easily controlled. The method of the instant invention comprises combining under anhydrous conditions, (A) an alkoxysilane represented by the formula $R^4_a Si(OR^5)_{4-a}$ or its partial hydrolysis product wherein $R^4$ is selected consisting of a monovalent hydrocarbon radical and a monovalent halogenated hydrocarbon radical, $R^5$ is selected from the group consisting of an alkyl radical containing 1 to 6 carbon atoms, and a has a value of 0 to 3; and (B) an organopolysiloxane or a mixture of organopolysiloxanes selected from the group consisting of organopolysiloxanes that are made of siloxane units selected from the group consisting of $R^1 SiO_{3/2}$ and $R^2 R^3 SiO$ and mixtures thereof wherein $R^1$, $R^2$ and $R^3$ are independently selected from the group consisting of monovalent hydrocarbon radicals and monovalent halogenated hydrocarbon radicals; followed by heating the mixture of (A) and (B) in the presence of a basic catalyst to perform a reequilibration reaction for said components (A) and (B).

12 Claims, No Drawings

MANUFACTURED METHOD OF ALKOXY RADICAL-CONTAINING SILICONE RESIN

BACKGROUND OF THE INVENTION

It is well known that alkoxy radical-containing silicone resins can be used widely as the feed material in making electrical insulating materials, heat-resistant paints, protective coating materials, and copolymers with organic polymers. In the conventional scheme, as described in U.S. Pat. No. 3,389,114, the alkoxy radical-containing silicone resins are manufactured by hydrolysis of an alkoxy radical-containing organosilane. However, this method has three serious problems. First of all, in this method, as an alkoxy radical is hydrolyzed and polycondensation is performed, the molecular weight always increases in the reaction. Consequently, it is very difficult to achieve control of the molecular weight. Second, as the molecular weight distribution of the manufactured silicone resin is wide, the softening point and other responses to thermal variation become slow. Third, as all of the feed materials used depend on alkoxysilanes, the inexpensive chlorosilanes and cyclic siloxanes cannot be used resulting in increased costs.

Although there is another method for the manufacture alkoxy radical-containing silicone resins, described in Japanese Kokai Patent Application No. Sho 50[1975]-77500, which comprises the hydrolysis/polycondensation of a chlorosilane in water and alcohol it can only solve the aforementioned third problem, while it has no effect in solving the aforementioned first and second problems.

It is an object of this invention to provide a method for manufacturing alkoxy radical-containing silicone resins wherein the molecular weight, viscosity, thermal transition point, and alkoxy radical content can be easily controlled.

SUMMARY OF THE INVENTION

This invention pertains to a method for manufacturing alkoxy radical-containing silicone resins. More specially, this invention pertains to a method for manufacturing an alkoxy radical-containing silicone resin wherein the molecular weight, viscosity, thermal transition, and alkoxy radical content that can be easily controlled.

THE INVENTION

This invention pertains to a method for manufacturing an alkoxy radical-containing silicone resin wherein the method comprises, under anhydrous conditions, adding (A) an alkoxysilane represented by the formula $R^4_aSi(OR^5)_{4-a}$ or its partial hydrolysis product, wherein $R^4$ is selected from the group consisting of a monovalent hydrocarbon radical and a monovalent halogenated hydrocarbon radical, $R^5$ is selected from an alkyl radical containing 1 to 6 carbon atoms, and a has the value of 0 to 3 to (B) an organopolysiloxane or a mixture of organopolysiloxanes selected from the group consisting of (1) an organopolysiloxane (a) made of siloxane units represented by the formula $R^1SiO_{3/2}$ wherein $R^1$ is selected from the group consisting of a monovalent hydrocarbon radical and a monovalent halogenated hydrocarbon radical; (2) a mixture of said organopolysiloxane (a) and an organopolysiloxane (b) made of siloxane units represented by $R^2R^3SiO$ wherein $R^2$ and $R^3$ are independently selected from the group consisting of monovalent hydrocarbon radicals and monovalent halogenated hydrocarbon radicals; (3) an organopolysiloxane (c) made of the siloxane units represented by the formula $R^1SiO_{3/2}$ and the siloxane units represented by $R^2R^3SiO$ wherein $R^1$, $R^2$ and $R^3$ have the same meanings as defined above; (4) a mixture of said organopolysiloxane (a) and said organopolysiloxane (c); (5) a mixture of said organopolysiloxane (b) and said organopolysiloxane (c); (6) a mixture of said organopolysiloxane (a), said organopolysiloxane (b) and said organopolysiloxane (c); followed by heating the mixture in the presence of a basic catalyst, to perform a reequilibration reaction for said components (A) and (B).

According to this invention, the organopolysiloxane or organopolysiloxane mixture component (B) used as the feed material in this invention is selected from the following 6 types of organopolysiloxanes: (1) organopolysiloxane (a) made of siloxane units represented by the formula $R^1SiO_{3/2}$ wherein $R^1$ is selected from the group consisting of a monovalent hydrocarbon radical and a monovalent halogenated hydrocarbon radical; (2) a mixture of said organopolysiloxane (a) and organopolysiloxane (b) made of siloxane units represented by $R^2R^3SiO$ wherein $R^2$ and $R^3$ are independently selected from the group consisting of monovalent hydrocarbon radicals and monovalent halogenated hydrocarbon radicals; (3) an organopolysiloxane (c) made of the siloxane units represented by the formula $R^1SiO_{3/2}$ and the siloxane units represented by $R^2R^3SiO$ wherein $R^1$, $R^2$ and $R^3$ have the same meanings as defined above; (4) a mixture of said organopolysiloxane (a) and said organopolysiloxane (c); (5) a mixture of said organopolysiloxane (b) and (c); (6) a mixture of said organopolysiloxane (a), said organopolysiloxane (b) and said organopolysiloxane (c).

Here, organopolysiloxane (a) is a type of organopolysiloxane made of siloxane units represented by the formula $R^1SiO_{3/2}$, wherein $R^1$ is selected from the group consisting of a monovalent hydrocarbon radical and a monovalent halogenated hydrocarbon radical. The monovalent hydrocarbon radicals may be exemplified by, but not limited to, methyl, ethyl, and other alkyl radicals; vinyl, allyl, and other alkenyl radicals; phenyl, naphthyl, and other aryl radicals; and others. The monovalent halogenated hydrocarbon radicals may be exemplified by, but not limited to, 3,3,3-trifluoropropyl, nonafluorobutylethyl, and other fluoro- substituted hydrocarbon radicals. Organopolysiloxane (a) may be manufactured by hydrolysis of the corresponding chlorosilanes or alkoxysilanes. The configuration may be well defined, such as a cage shape, a ladder shape, etc., or it may be not clearly defined. The organopolysiloxane prepared in this way usually contains silanol radicals, and/or alkoxy radicals.

Organopolysiloxane (b) is a type of organopolysiloxane made of siloxane units represented by $R^2R^3SiO$ wherein $R^2$ and $R^3$ may be independently selected from the group consisting of monovalent hydrocarbon radicals and monovalent halogenated hydrocarbon radicals. $R^2$ and $R^3$ may be exemplified by the same radicals as for the aforementioned R1. Organopolysiloxane (b) usually has a cyclic or linear configuration. In the case of a linear configuration, the terminals usually have silanol radicals, alkoxy radicals, and other hydrolytic radicals.

Organopolysiloxane (c) is a type of organopolysiloxane made of siloxane units represented by the formula $R^1SiO_{3/2}$ and siloxane units represented by $R^2R^3SiO$ wherein $R^1$, $R^2$ and $R^3$ have the same meanings as above. Organopolysiloxane (c) may be prepared by hydrolysis of a chlorosilane or alkoxysilane. As organopolysiloxane (c) prepared in this method usually contain a large amount of silanol radicals, alkoxy radicals, and other hydrolytic radicals, it is also acceptable to reduce the silanol radical amount by performing heat treatment for the hydrolysis-treated organopolysiloxane in the presence of an acidic or basic catalyst. In addition, organopolysiloxane (c) may also be manufactured by copolymerization in the reequilibration reaction between said organopolysiloxane (a) and organopolysiloxane (b).

In the manufacturing method of this invention, among the aforementioned types of organopolysiloxanes, component (B) of the feed material preferably makes use of one of the following: (1) organopolysiloxane (a), (2) a mixture of organopolysiloxane (a) and organopolysiloxane (b), (3) organopolysiloxane (c). However, in some case, component (B) may be one of the following: (4) a mixture of organopolysiloxane (a) and organopolysiloxane (c), (5) a mixture of organopolysiloxane (b) and organopolysiloxane (c), (6) organopolysiloxane (a), organopolysiloxane (b), and organopolysiloxane (c). In addition, the organopolysiloxane (B) may also contain a siloxane or polysiloxane composed of 4-functional siloxane units represented by the formula $SiO_{4/2}$. In this case, the 4-functional polysiloxane units are contained in the final product of the alkoxy radical-containing organopolysiloxane.

According to this invention, the organopolysiloxane or organopolysiloxane mixture component (B) usually contains silanol radicals, alkoxy radicals, or other hydrolytic radicals. It is difficult to achieve a correct control of the content of the alkoxy radicals of the ultimately obtained alkoxy radical-containing silicone resin with the aforementioned hydrolytic radicals contained. Consequently, in this invention, in order to make a correct measurement of the amount of the alkoxy radicals in component (B), it is preferred that the silanol radicals and alkoxy radicals or other hydrolytic radicals be removed beforehand. More specifically, in the method of this invention, before addition of component (A), component (B) is heated. It is preferred that the water formed be removed together with the organic solvent from the reaction system by distillation, so that the silanol radicals and alkoxy radicals contained in component (B) are removed.

According to this invention, in the manufacturing process, when component (A) is added to component (B), it is necessary to ensure that component (B) is in the anhydrous state. If this condition cannot be guaranteed, it is impossible to achieve a correct control of the content of the alkoxy radicals in the manufactured silicone resin. The purpose of control of the water content is to prevent hydrolysis of the alkoxy radicals during the reequilibration reaction. Consequently, the tolerable water content may be determined corresponding to the target precision of the amount of alkoxy radicals. Usually, sufficient results can be realized by adding an organic solvent azeotropic with water to the organopolysiloxane as component (B), followed by azeotropic dehydration.

According to this invention, the alkoxysilane or its partial hydrolysis product, component (A), is needed for introducing the alkoxy radicals into the silicone resin. This component (A) is the organopolysiloxane represented by the formula $R^4{}_a Si(OR^5)_{4-a}$ or its partial hydrolysis product, wherein $R^4$ is selected from the group consisting of a monovalent hydrocarbon radical and a monovalent halogenated hydrocarbon radical; $R^5$ is selected from the group consisting of a an alkyl radical having 1 to 6 carbon atoms; and a has a value of 0 to 3, preferably 1 or 2. $R^4$ may be exemplified by, but not limited to the same groups as $R^1$. $R^5$ may be exemplified by, but not limited to, methyl, ethyl, propyl, butyl and other alkyl radicals containing 1 to 6 carbon atoms. The alkoxysilane or its partial hydrolysis product may be exemplified by, but not limited to phenyltrimethoxysilane, phenyltriethoxysilane, methyltrimethoxysialne, dimethyldimethoxysilane, diphenyldimethoxysilane, methylvinyldimethoxysilane, methylphenyldiethoxysilane, as well as siloxanes or polysiloxanes with a partial hydrolytic structure derived from the aforementioned types of alkoxysilane.

The amount of component (A) added depends on the composition of the desired type of alkoxy radical-containing silicone resin and can be determined by one skilled in the art. However, usually, the molar amount of the siloxane units of component (A) in the total siloxane units should be 0.1-50 mol %.

According to this invention, component (A) is added to component (B), followed by heating in the presence of a basic catalyst to perform the reequilibration reaction. The basic catalyst used in this case should be selected from the compounds useful in rearranging the siloxane made of units represented by the formula $R^2R^3SiO$ wherein $R^2$ and $R^3$ are as described above. In order to perform this rearrangement reaction, an alkali metal catalyst is preferred. In this case, considering the high activity and high reaction rate, the preferred type of alkali metal elements include potassium and cesium, which may be used in the form of hydroxides, alcoholates, silanolates, and other compounds. Specific examples include potassium hydroxide, cesium hydroxide, potassium methoxide, potassium t-butoxide, potassium silanolate, and others. These types of basic catalysts may be added either in the solid form directly or in the form of a solution in a small amount of water and a small amount of component (B). The amount of basic catalyst added to component (B) should be 10–10000 ppm, preferably 100–5000 ppm.

In order to prevent precipitation of the resin in the reequilibration reaction and to suppress a decrease in the viscosity of the reaction system, it is preferred that the manufacturing operation be performed in the presence of an appropriate type of organic solvent. The type of organic solvent used depends on the type of the desired type of siloxane unit to be manufactured. The organic solvent may be selected from the toluene, xylene, and other aromatic type solvents, acetone, methyl isobutyl ketone, and other ketone solvents, octane, and other aliphatic hydrocarbon solvents, and other solvents.

There is no special limitation on the order of addition of the aforementioned component (B), component (A), basic catalyst, and organic solvent. For example, in the case of removal of the moisture and silanol radicals in the organopolysiloxane as component (B), the basic catalyst is added to component (B) and the organic solvent, followed by heating for azeotropic dehydration together with removal of the organic solvent; then, alkoxysilane as component (A) is added. When alkoxy radicals and other hydrolytic radicals are contained in component (B), the basic catalyst is added to the organopolysiloxane and organic solvent; after water is added so that the hydrolytic radicals are decomposed, azeotropic dehydration is performed together with the organic solvent; then, the alkoxysilane is added. When component (B) does not contain silanol radicals and moisture, it is preferred that the addition be performed in the order of component (B), component (A), organic solvent, and basic catalyst, for the reequilibration reaction.

In the manufacturing process, the reequilibration reaction is performed by heating. The reequilibration reaction refers to the reaction in which cutting and rebonding take place randomly for the siloxane bonds and as a result, the organopolysiloxane and silane present in the reaction system are mutually redistributed. In the method of this invention, the silicon-alkoxy radical bonds are also subject to reequilibration together with the siloxane bonds. It is preferred that this reequilibration reaction be carried out at a temperature of 80° C. to 200° C. When the temperature is too low, the reequilibration reaction cannot be carried out sufficiently. On the other hand, if the temperature is too high, decomposition may take place for the organic radicals bonded with silicon. More preferably, the temperature for the reequilibration reaction should be 100° C. to 150° C. When an organic solvent is used, by selecting the boiling point of the organic solvent in this range, the reequilibration reaction can be carried out easily at the reflux temperature of the organic solvent.

Attention should be paid to the fact that the process of the reequilibration reaction should be under anhydrous conditions. In the reequilibration reaction, if the moisture invades the reaction system, hydrolysis of the alkoxy radicals takes place and the content of the alkoxy radicals contained in the ultimately obtained silicone resin is decreased. In the worst case, gelling takes place in the reequilibration reaction and the silicone resin is precipitated.

As the reequilibration reaction progresses, it may be possible to observe a change in the reflux state of the alkoxysilane and the reflux state of the organic solvent when it is used. However, in many cases, no change in the appearance can be observed. Consequently, in order to track the progress of the reaction, a small amount of the reaction liquid is extracted and neutralized, followed by measurement of the characteristics of the silicone resin. This is the most reliable method. The molecular weight is the most preferred characteristic for the measurement. On the other hand, for the silicone resin in liquid form at room temperature, the reaction can also be tracked by measuring the viscosity. Also, for a thermoplastic silicone resin, measurement of its softening point and glass transition point can be used to track the reaction. The time at which there is no more change in the characteristics even when the heating operation with reflux is continued is usually taken as the end point.

According to this invention, the manufacturing process might be terminated when the end point is found using the aforementioned method. However, as a prominent feature of this invention, a fine adjustment of the molecular weight can be performed after the end point by adjusting the solid content in the solution. That is, if an additional organic solvent is added, the molecular weight may decrease. On the other hand, if the organic solvent is removed from the reaction system, the molecular weight increase. It is recommended that this operation be performed as a finishing step after the end point. With the aid of this operation, it is possible to adjust the molecular weight precisely to the target level before the reaction product is removed from the reactor. There is no change in the content of the alkoxy radicals even when this operation is carried out.

As soon as the reequilibration reaction is completed, the basic catalyst is neutralized. The neutralization operation may be carried out using any of the conventionally known substances, such as carbon dioxide, carboxylic acid, and other weak acids, trimethylchlorosilane, and other chlorosilanes, or other neutralizers. It is preferred that the salt formed in the neutralization operation be removed by filtration, water washing, or other methods known in the art.

The alkoxy radical-containing silicone resin produced in this way may be used in various applications, such as electrical insulating materials, heat-resistant paints, protective coating materials, modifiers of physical properties of organic resins, and others.

So that those skilled in the art can understand and appreciate the invention taught herein, the following examples are presented, being it understood that these examples should not be used to limit the scope of this invention found in the claims attached hereto.

In the following examples, the viscosity refers to the value measured at 25° C. "Mn" refers to the number-average molecular weight. "Mw" refers to the weight-average molecular weight. "%" refers to wt %.

PREPARATION EXAMPLE 1 PREPARATION OF PNENYLTRICHLOROSILANE HYDROLYSIS PRODUCT 300 g of phenyltrichlorosilane were added and dissolved in 200 g of toluene. The solution was added dropwise to a reaction container containing 250 g of water and 400 g of toluene at 10° C. After the addition was completed, heating with reflux was performed for 6 h. Following the reflux, the toluene phase was isolated and the toluene solution was washed with 300 g of water repeatedly until it became neutral. Then, under a reduced pressure and at 80° C., the toluene was removed by distillation, forming 177.7 g of white solid (referred to as sample A hereinafter).

PREPARATION EXAMPLE 2

PREPARATION OF MONOPHENYL-DIMETHYLSILOXANE COPOLYMER 336.7 g of phenyltrichlorosilane and 58.1 g of dimethyldichlorosilane were dissolved in 126 g of toluene. The solution was added dropwise to a reaction container containing 100 g of water, 400 g of toluene, and 140 g of isopropanol at 10° C. After the end of the addition, the mixture was heated with reflux for 1 h. Following the reflux, the toluene phase was isolated and the toluene solution was washed with 300 g of water repeatedly until it became neutral, forming 452 g of a toluene solution of a siloxane copolymer having a 50 wt % solid content (referred to as sample B hereinafter).

0.2 g of potassium hydroxide was added to sample B, followed by separation of the water by an azeotropic operation with the toluene. After stopping the flow of water from the reactor, heating with reflux of toluene was continued for 5 h, and the system was then cooled. After neutralization by means of acetic acid, water washing was performed three times with 300 g of water. The toluene was removed by distillation by heating under a reduced pressure, forming 215 g of a silicone copolymer (the obtained white solid is referred to as sample C hereinafter). By means of 29Si-NMR, it was found that no silanol radicals were present in sample C.

PREPARATION EXAMPLE 3 PREPARATION OF MONOPHENYL-DIMETHYL-4-FUNCTIONAL SILOXANE COPOLYMER 317.3 g of phenyltrihlorosilane, 38.7 g of dimethyldichlorosilane, and 34.0 g of tetrachlorosilane were added and dissolved in 126 g of toluene. The solution was added dropwise to a reaction container containing 100 g of water, 400 g of toluene, and 140 g of isopropanol at 10° C. After the end of the addition, the system was heated with reflux for 1 h, followed by isolation of the toluene phase. The toluene solution was repeatedly washed with 300 g of water until it became neutral, forming 438 g of a toluene solution of a siloxane copolymer with a solid content of 50 wt % (the obtained white solid is referred to as sample D hereinafter).

EXAMPLE 1

106.9 g of sample A prepared in Preparation Example 1 and 118.9 g of toluene were added to a reaction container, followed by addition of 0.2 g of cesium hydroxide. Heating with reflux was performed while the distilled water was removed. After no more water was distilled out, the system was cooled. 12.0 g of dimethyldimethoxysilane was added to the system, and the solid content was adjusted to about 50%, followed by heating with reflux again. Sampling was performed every 2 h. After a neutral state was reached, the molecular weight distribution was measured using GPC. After 10 h, it was found that the molecular weight became constant. The system was cooled. After the reaction mixture was neutralized by 0.2 g of trimethylchlorosilane, the salt was removed by filtration. The toluene was distilled off in vacuum, forming 110.5 g of colorless silicone resin. The obtained sample of silicone resin has Mn=1810, Mw=3470, glass transition point of 78° C., softening point of 101° C., and methoxy radical content of 5.1% (compared with the calculated value of 5.2%).

EXAMPLE 2

100.6 g of sample A prepared in Preparation Example 1 and 136.7 g of toluene were added to a reaction container, followed by addition of 0.2 g of cesium hydroxide. Heating with reflux was performed while the distilled water was removed. After no more water was distilled out, the system was cooled. 16.3 g of octamethylcyclosiloxane and 19.8 g of phenyltrimethoxysilane were added to the system, and the solid content was adjusted to about 50%, followed by heating with reflux again. Sampling was performed every 2 h. After a neutral state was reached, the molecular weight distribution was measured using GPC. After 14 h, it was found that the molecular weight became constant. The system was cooled. After the reaction mixture was neutralized by 0.2 of trimethylchlorosilane, the salt was removed by filtration. The toluene was distilled off in vacuum, forming 129.6 g of colorless silicone resin. The obtained sample of silicone resin has Mn=1550, Mw=2830, glass transition point of 44° C., softening point of 64° C., and methoxy radical content of 6.6% (compared with the calculated value of 6.7%).

EXAMPLE 3

116.9 g of sample B prepared in Preparation Example 2 and 136.7 g of toluene were added to a reaction container, followed by addition of 0.2 g of potassium hydroxide. Heating with reflux was performed while the distilled water was removed. After no more water was distilled out, the system was cooled. 19.8 g of phenyltrimethoxysilane was added to the system, and the solid content was adjusted to about 50%, followed by heating with reflux again. Sampling was performed every 2 h. After a neutral state was reached, the molecular weight distribution was measured using GPC. After 14 h, it was found that the molecular weight became constant. The system was cooled. After the reaction mixture was neutralized by 0.2 g of trimethylchlorosilane, the salt was removed by filtration. The toluene was distilled off in vacuum, forming 132.0 go of colorless silicone resin. The obtained sample of silicone resin has Mn=1560, Mw=2840, glass transition point of 44° C., softening point of 65° C., and methoxy radical content of 6.6% (compared with the calculated value of 6.7%).

EXAMPLE 4

12.9 g of sample A prepared in Preparation Example 1 and 149.6 g of toluene were added to a reaction container, followed by addition of 0.2 g of potassium hydroxide. Heating with reflux was performed while the distilled water was removed. After no more water was distilled out, the system was cooled. 116.9 g of sample B obtained in Preparation Example 2 and 19.8 g of phenyltrimethoxysilane were added, and the solid content was adjusted to about 50%, followed by heating with reflux again. Sampling was performed every 2 h. After a neutral state was reached, the molecular weight distribution was measured using GPC. After 14 h, it was found that the molecular weight became constant. The system was cooled. After the reaction mixture was neutralized by 0.2 g of trimethylchlorosilane, the salt was removed by filtration. The toluene was distilled off in vacuum, forming 142.1 g of colorless silicone resin. The obtained sample of silicone resin has Mn=1740, Mw=3310, glass transition point of 57° C., softening point of 78° C., and methoxy radical content of 6.0% (compared with the calculated value of 6.1%).

EXAMPLE 5

116.9 g of sample C prepared in Preparation Example 2, 7.4 g of octamethylcyclotetrasiloxane, 144.1 g of toluene, and 19.8 g of phenyltrimethoxysilane were added to a reaction container, followed by addition of 0.2 g of cesium hydroxide. Heating with reflux was performed. Sampling was performed every 2 h. After a neutral state was reached, the molecular weight distribution was measured using GPC. After 8 h, it was found that the molecular weight became constant. The system was cooled. After the reaction mixture was neutralized by 0.2 g of trimethylchlorosilane, the salt was removed by filtration. The toluene was distilled off in vacuum, forming 135.4 g of colorless silicone resin. The obtained sample of silicone resin has Mn=1480, Mw=8750, glass transition point of 33° C., softening point of 51° C., and methoxy radical content of 6.4% (compared with the calculated value of 6.5%).

EXAMPLE 6

100.6 g of sample a prepared in Preparation Example 1, and 273.4 g of toluene, were added to a reaction container, followed by addition of 0.4 g of cesium hydroxide. Heating with reflux was performed while the distilled water was removed. After no more water was distilled out, the system was cooled. 116.9 g of sample C obtained in Preparation Example 2 and 16.3 g of octamethylcyclotetrasiloxane, as well as 19.8 g of phenyltrimethoxysilane were added, and the solid content was adjusted to about 50%, followed by heating with reflux again. Sampling was performed every 2 h. After a neutral state was reached, the molecular weight distribution was measured using GPC. After 14 h, it was found that the molecular weight became constant. The system was cooled. After the reaction mixture was neutralized by 0.4 g of trimethylchlorosilane, the salt was removed by filtration. The toluene was distilled off in vacuum, forming 263.8 g of colorless silicone resin. The obtained sample of silicone resin has Mn=1550, Mw=2830, glass transition point of 45° C., softening point of 65° C., and methoxy radical content of 6.6% (compared with the calculated value of 6.7%).

EXAMPLE 7

100.6 g of sample A prepared in Preparation Example 1, 16.3 g of octamethylcyclotetrasiloxane and 136.7 g of toluene were added to a reaction container, followed by addition of 0.2 g of cesium hydroxide. Heating with reflux was performed while the distilled water was removed. After no more water was distilled out, the system was cooled. Then 19.8 g of phenyltrimethoxysilane was added, and the solid content was adjusted to about 50%, followed by heating with reflux again. Sampling was performed every 2 h. After a neutral state was reached, the molecular weight distribution was measured using GPC. After 8 h, it was found that the molecular weight became constant. The system was cooled. After the reaction mixture was neutralized by 0.2 g of trimethylchlorosilane, the salt was removed by filtration. The toluene was distilled off in vacuum, forming 131.8 g of colorless silicone resin. The obtained sample of silicone resin has Mn=1540, Mw=2810, glass transition point of 45° C., softening point of 65° C., and methoxy radical content of 6.6% (compared with the calculated value of 6.7%).

EXAMPLE 8

116.9 g of sample C prepared in Preparation Example 2, 19.8 g of phenyltrimethoxysilane, and 136.7 g of toluene were added to a reaction container, followed by addition of 0.2 g of cesium hydroxide. Heating with reflux was performed. Sampling was performed every 2 h. After a neutral state was reached, the molecular weight distribution was measured using GPC. After 6 h, it was found that the molecular weight became constant. The system was cooled. After the reaction mixture was neutralized by 0.2 g of trimethylchlorosilane, the salt was removed by filtration. The toluene was distilled off in vacuum, forming 130.8 g of colorless silicone resin. The obtained sample of silicone resin has Mn=1580, Mw=2860, glass transition point of 46° C., softening point of 65° C., and methoxy content of 6.6% (calculated value of 6.7%).

EXAMPLE 9

The operation was performed in the same way as in Example 7 except that instead of the octamethylcyclotetrasiloxane used in Example 7, 18.9 g of 1, 3, 5, 7-tetramethyltetravinylcyclotetrasiloxane were used. After heating with reflux for 8 h, 132.3 g of colorless silicone resin were obtained. The obtained sample of silicone resin has Mn=1590, Mw=2860, glass transition point of 42° C., softening point of 60° C., and methoxy content of 6.6% (calculated value of 6.7%).

EXAMPLE 10

The operation was performed as in Example 7, with the solid content during heating with reflux changed in the following order: 40%, 60%, 40%, and 60%, for each of which the reequilibration reaction was performed for 5 h. After 5 h, sampling was performed, and the characteristics of the resins formed were measured, with the results listed in Table I. From these results, it was found that by changing the solid content, the molecular weight and the thermal properties can be changed reversibly with the methoxy radical content kept constant. The results are presented in Table 1.

TABLE 1

| Solid content in reequilibration reaction (%) | Mn | Mw | Glass transition point (°C.) | Softening point (°C.) | Methoxy radical content (%) |
|---|---|---|---|---|---|
| 40 | 1360 | 2140 | 35 | 55 | 6.6 |
| 60 | 1760 | 3520 | 54 | 75 | 6.6 |
| 40 | 1390 | 2210 | 36 | 55 | 6.6 |
| 60 | 1740 | 3500 | 56 | 75 | 6.6 |

EXAMPLE 11

The operation was performed in the same way as in Example 7 except that the amounts of sample A and octamethylcyclotetra- siloxane were changed to 51.6 g and 29.6 g, respectively, and 24.0 g of dimethyldimethoxysilane were used instead of the phenyltrimethoxysilane used in Example 7. As a result, 102.0 g of colorless silicone resin were obtained. The obtained sample of silicone resin has Mn=2440, Mw=5240, viscosity of 18900 cP, and methoxy content of 11.6% (calculated value of 11.8%).

EXAMPLE 12

The operation was performed in the same way as in Example 3 except that 113.9 g of sample D were used instead of sample B used in Example 3. Further, the amount of toluene used was changed to 133.7 g, forming 129.8 g of colorless silicone resin. The obtained sample of silicone resin has Mn=3510, Mw=6810, glass transition point of 74° C., softening point of 92° C., and methoxy content of 6.9% (calculated value of 7.0%).

What is claimed is:

1. A method for manufacturing an alkoxy radical-containing silicone resin wherein the method comprises, combining, under anhydrous conditions,
   (A) an alkoxysilane represented by the formula $R^4_a Si(OR^5)_{4-a}$ or its partial hydrolysis product, wherein $R^4$ is selected from the group consisting of a monovalent hydrocarbon radical and a monovalent halogenated hydrocarbon radical, $R^5$ is selected from an alkyl radical containing 1 to 6 carbon atoms, and a has the value of 0 to 3; and
   (B) an organopolysiloxane or a mixture of organopolysiloxanes selected from the group consisting of
      (1) an organopolysiloxane (a) made of siloxane units represented by the formula $R^1 SiO_{3/2}$ wherein $R^1$ is selected from the group consisting of a monovalent hydrocarbon radical and a monovalent halogenated hydrocarbon radical;
      (2) a mixture of said organopolysiloxane (a) and an organopolysiloxane (b) made of siloxane units represented by $R^2 R^3 SiO$ wherein $R^2$ and $R^3$ are independently selected from the group consisting of monovalent hydrocarbon radicals and monovalent halogenated hydrocarbon radicals;

(3) an organopolysiloxane (c) made of the siloxane units represented by the formula $R^1SiO_{3/2}$ and the siloxane units represented by $R^2R^3SiO$ wherein $R^1, R^2$ and $R^3$ are as defined above;

(4) a mixture of said organopolysiloxane (a) and said organopolysiloxane (c);

(5) a mixture of said organopolysiloxane (b) and said organopolysiloxane (c); and (6) a mixture of said organopolysiloxane (a), said organopolysiloxane (b) and said organopolysiloxane (c);

wherein said organopolysiloxane or mixture of organopolysiloxanes is essentially free of silanol, alkoxy or other hydrolytic radicals; followed by heating the mixture of (A) and (B) in the presence of a basic catalyst under anhydrous conditions to perform a reequilibration reaction for said components (A) and (B).

2. The method as claimed in claim 1 wherein $R^1$ is a phenyl radical.

3. The method as claimed in claim 1 wherein there is also present an organic solvent.

4. The method as claimed in claim 1 wherein the basic catalyst is an alkali metal catalyst.

5. The method as claimed in claim 3 wherein organopolysiloxane component (B) is heated and any water formed is removed together with the organic solvent by distillation so as to remove the silanol radical and alkoxy radical contained in said component (B) prior to combining with component (A).

6. The method as claimed in claim 1 wherein the reequilibration is performed at a temperature of 80° C. to 200° C.

7. The method as claimed in claim 1 wherein component (A) is dimethyldimethoxysilane.

8. The method as claimed in claim 1 wherein component (A) is phenyltrimethoxysilane.

9. The method as claimed in claim 1 wherein the catalyst is cesium hydroxide.

10. The method as claimed in claim 1 wherein the catalyst is potassium hydroxide.

11. The method as claimed in claim 1 wherein $R^2$ is a methyl radical.

12. The method as claimed in claim 1 wherein $R^3$ is a methyl radical.

* * * * *